Dec. 30, 1930.                    W. BLASS                    1,786,693
            TRANSFORMATION OF A MOTOR CAR WITH CLOSED
              CARRIAGE BODY INTO A PLATFORM LORRY
                       Filed Nov. 13, 1929
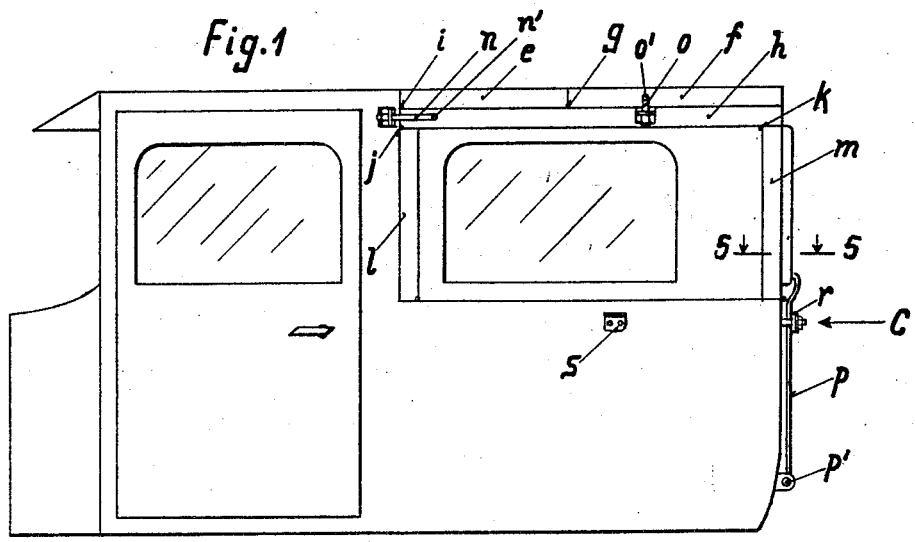
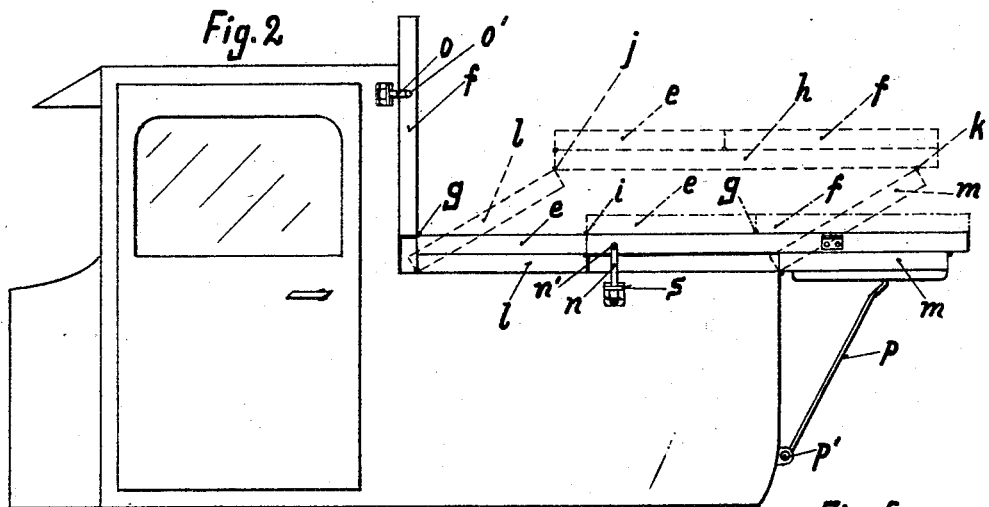
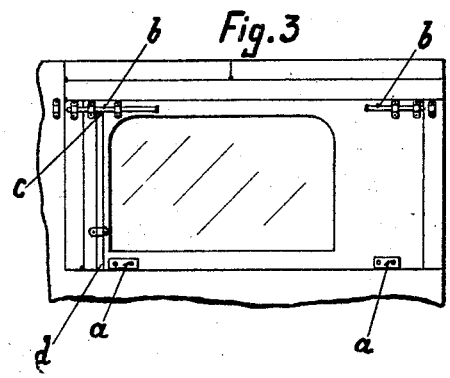
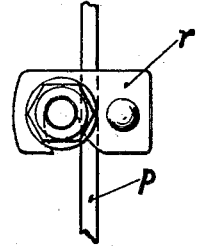
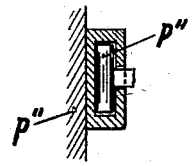

Patented Dec. 30, 1930

1,786,693

UNITED STATES PATENT OFFICE

WILHELM BLASS, OF HAMBURG, GERMANY

TRANSFORMATION OF A MOTOR CAR WITH CLOSED CARRIAGE BODY INTO A PLATFORM LORRY

Application filed November 13, 1929, Serial No. 406,917, and in Germany August 1, 1929.

This invention relates to a motor car with closed carriage body for passengers which is capable of being transformed into a platform lorry, the roof and those parts of the rear top part of the carriage body, which remain after the side window frame has been folded inwards, being adapted to be lowered onto the lower body part to form a platform.

Up to the present a platform has simply been placed on an open passenger motor car when the motor car had to be used for transporting purposes. This method presents the inconvenience, that the motor car is easily damaged specially when it has a foldable cover, another inconvenience being that the driver is not protected in bad weather as the cover can not be raised.

These inconveniences are obviated by this invention as owing to the improved construction an ordinary closed passenger car can be transformed in a few seconds by several manipulations into a lorry, the front cover or front portion of the carriage body remaining as it is so that the driver is protected.

An embodiment of the invention is illustrated by way of example in the accompanying drawing in which:

Fig. 1 shows in side elevation the carriage body of a motor car for passengers.

Fig. 2 is a similar view as Fig. 1 showing a carriage body transferred into a platform.

Fig. 3 shows in elevation the window frame viewed from the inner side.

Fig. 4 shows the locking device for the supporting stays on the rear portion of the car viewed in the direction of the arrow line C (Fig. 1).

Fig. 5 is a section on line 5—5 of Fig. 1.

The side walls of the carriage body are fixed by means of hinges $a$ (Fig. 3) so that, after the window panes have been completely lowered and latches $b$ withdrawn, the window frames can be laid down in inward direction. Each window frame has on the inner side grooves $c$, $d$ designed to accommodate a rod fixed at $e$ so that after the window frame has been laid down the rod serves as support for this frame. The cover is composed of several parts suitably connected by hinges, the roof consisting of two parts $e$ and $f$ connected the one with the other by hinges $q$. Under these roof parts $e$, $f$, a roof part $h$ is arranged, hingedly connected by hinges $i$ with the top part $e$ and by hinges $j$ and $k$ with the vertical cover parts $l$ and $m$ respectively.

Screws $n$ and $o$ pivotally fixed on pins $n'$, $o'$ respectively, adapted to engage with angle irons fixed on the carriage body, and further stays $p$, hingedly mounted on the rear wall of the carriage body and locked by two iron plates $r$ of suitable shape (Fig. 4), serve for securing in position and for ensuring the stability of the collapsible parts of the carriage body. The stays $p$ hingedly fixed at $p'$ have each a transverse extension $p''$ engaging with accordingly shaped bars on the part $m$ of the carriage body frame, so that when the roof is lowered to form a platform it is securely supported.

To transform the carriage body into a platform the window frames have to be laid down in inward direction, the nuts on the screws $n$ and $o$ loosened and the two overlapping iron plates $r$ turned inwards, whereupon the parts $l$ and $m$ are brought into the inclined position indicated in dash lines in Fig. 2 and then further lowered into the horizontal position. The parts $e$ and $f$ adopt consequently the position indicated in Fig. 2 in mixed lines. The part $e$ is, as long as the parts $l$ and $m$ are still in the inclined position shown in Fig. 2, turned 180° towards the front side around the hinges $i$, so that the part $f$ hingedly connected with the part $e$ assumes the vertical position. The screws $n$ and $o$ are then tightened to secure the platform in its position, the nuts or screws $n$ securely holding the platform by means of angle irons $s$ fixed on the outer side of the wall of the carriage body, the nuts or the screws $o$ securely holding the part $f$ in its position by engaging over corresponding angle irons on the front part of the carriage body. Each screw bolt has a cavity in its hinged end to facilitate the turning of the screw bolts. The stays $p$ serve to support the platform.

I claim:—

A motor car for passengers transformable into a platform lorry, comprising in combination with the stationary front part of the carriage body and the stationary lower portion of the rear part of the carriage body, hingedly mounted side walls adapted to be laid down in inward direction, hingedly mounted front and rear supporting frames of the roof, a double roof composed of a top roof consisting of two hingedly connected parts and of a lower roof hingedly connected at the front edge to the front edge of the front part of said top roof, stays hingedly mounted on the rear wall of the carriage body to support the collapsed parts of the roof forming a platform, and screw bolts and nuts for locking the platform in position.

In testimony whereof I affix my signature.

WILHELM BLASS.